United States Patent
Leane et al.

[15] 3,699,428
[45] Oct. 17, 1972

[54] NUCLEAR MAGNETIC RESONANCE SPECTROMETER SYSTEM

[72] Inventors: John Bryant Leane, Beaconsfield; Peter Higham, High Wycombe, both of England

[73] Assignee: Perkin-Elmer Limited, Beaconsfield, England

[22] Filed: July 7, 1969

[21] Appl. No.: 839,423

[30] Foreign Application Priority Data

July 4, 1968 Great Britain..........31,954/68

[52] U.S. Cl. .............................................324/0.5 R
[51] Int. Cl. .............................................G01n 27/78
[58] Field of Search .........324/0.5 R, 0.5 A, 0.5 AC, 324/0.5 AH

[56] References Cited

UNITED STATES PATENTS 3,500,178  3/1970  Paitich........................324/0.5
3,487,293  12/1969  Seki........................324/0.5 A Primary Examiner—Michael J. Lynch
Attorney—Edward R. Hyde, Jr.

[57] ABSTRACT

A nuclear magnetic resonance system is provided which comprises a N.M.R. spectrometer having field modulation and an accessory means adapted to be operationally coupled to the spectrometer for providing alternatively spin decoupling or field locking facilities. The accessory means includes a variable frequency oscillator that is coupled to the field modulation means of the N.M.R. spectrometer through a variable attenuator. The variable frequency oscillator is swept in synchronism with the field modulation means so that a working sideband component exhibiting a fixed frequency is generated during this sweep. The attenuator is adjusted to attenuate the oscillatory signal to one level when the spectrometer is operated in the spin decoupling mode and to attenuate the oscillatory signal to a second level when the spectrometer is operated in the field stabilization mode.

6 Claims, 1 Drawing Figure

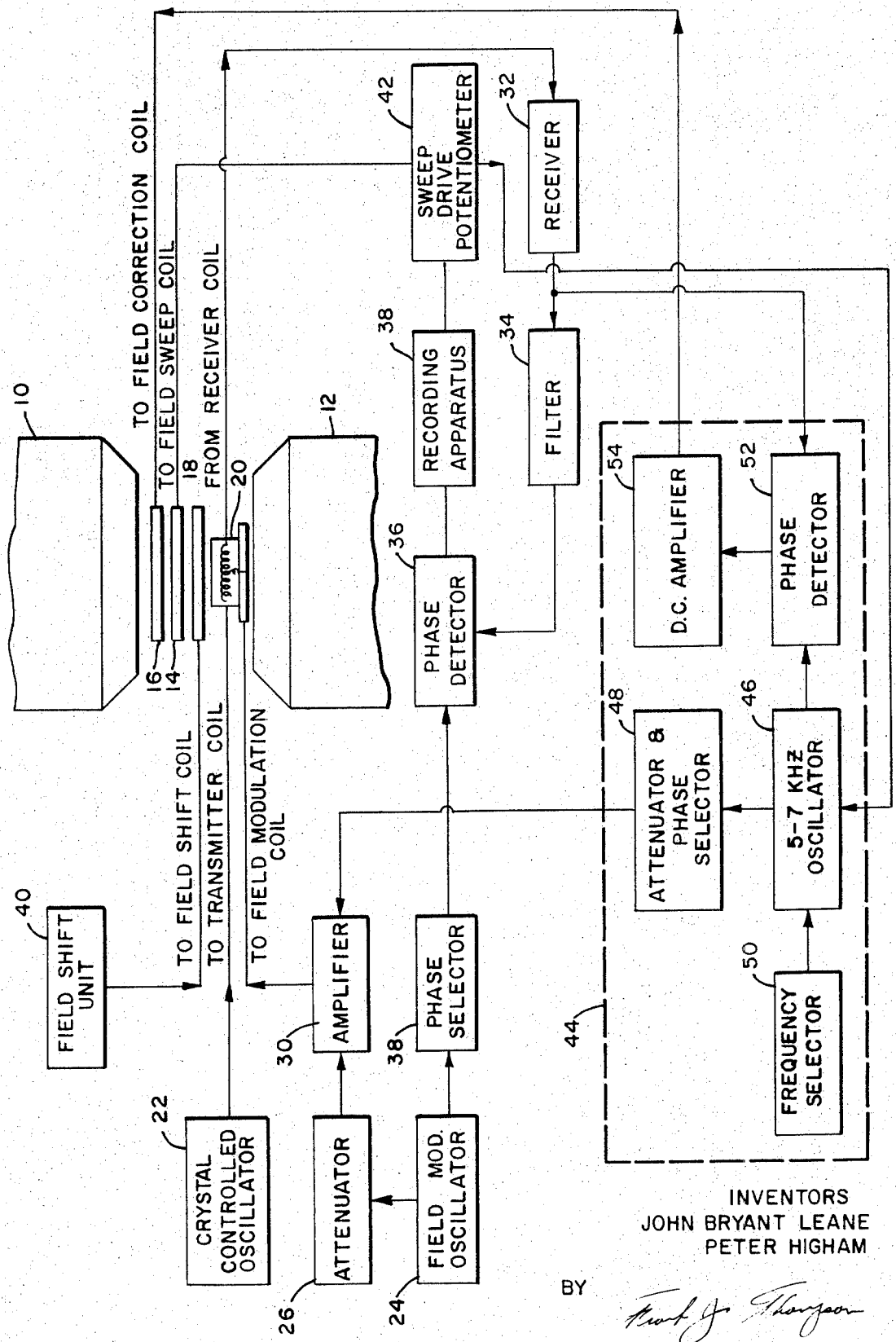

NUCLEAR MAGNETIC RESONANCE SPECTROMETER SYSTEM

This invention relates to Nuclear Magnetic Resonance (N.M.R.) systems of the type wherein an N.M.R. spectrometer providing basic analytical facilities is adapted for cooperation with accessory means through which the range of the facilities may be extended at will by the user.

The vast majority of N.M.R. analysis work is of a routine nature and does not justify the cost and complexities of providing integral with the instrument seldom used sophistications such as spin decoupling. It is known that even field locking may be dispensed with in an instrument incorporating permanent magnet polarization. On the other hand, at those times when it is desirable to employ these sophisticated techniques, the provision of each of these techniques through the use of separate accessory equipment is undesirable, since it leads to both duplication and idleness of components in the overall system.

Spin decoupling is the most commonly used accessory facility for a basic spectrometer, but when the instrument is an unlocked instrument, then the addition of a field locking system is equally important in refining the N.M.R. analysis.

Accordingly it is an object of this invention to provide an improved N.M.R. spectrometer system.

Another object of the invention is to provide an improved form of accessory apparatus for use with an N.M.R. spectrometer.

Another object of the invention is to provide a basic N.M.R. spectrometer system of the unlocked permanent-magnet type wherein spin decoupling and field locking are available as alternative accessory facilities.

A further object of the invention is to provide a basic N.M.R. spectrometer system of the unlocked permanent-magnet type and wherein spin decoupling and field locking facilities are provided by an accessory apparatus.

According to the present invention there is provided an N.M.R. system comprising a basic N.M.R. spectrometer and an accessory means adapted to be operationally coupled to the spectrometer when the addition of spin decoupling or field locking facilities are alternatively utilized. The spectrometer includes a permanent-magnet polarizing field system provided with a field locking winding, field modulation and is adapted, independently of the accessory means, for analyzing an N.M.R. spectrum by a measuring sideband provided through field modulation at a first modulation frequency. The measuring sideband is caused to scan the spectrum by the application of field sweep. The accessory includes means for applying field modulation at a second modulation frequency $f_2$ swept over a convenient frequency range in synchronism with the field sweep in a manner for providing that when the spectrometer and accessory are operationally interconnected, a second sideband is generated at a desired location in the frequency spectrum and operates as a decoupling sideband when excited at a comparatively high energy level through nuclear coupling in a measuring sample, or, as a locking sideband when excited at a conveniently lower energy level through nuclear coupling in a locking sample admixed with said measuring sample. The accessory further comprises an audio phase detector having an input at the second modulation frequency for enabling a dispersion component of the nuclear signal from the locking sample to be detected and to control a field correcting energization to said field looking winding.

These and other objects and features of the invention will become apparent from the following specification and the drawing, which is a diagram in block form of an N.M.R. system and accessory constructed in accordance with features of the invention.

Referring now to the drawing, the polarizing field system of the basic N.M.R. spectrometer comprises a permanent magnet having poles 10 and 12 defining a working gap of high flux stability and homogeneity, as required for high resolution N.M.R. A field sweep winding 14, a field correcting winding 16 and a field shift winding 18 are positioned so as to influence the flux in the gap, within which there is accommodated a probe 20 including transmitter coil and a receiver coil, orthogonal with each other, as well as a field modulation winding. The probe 20 additionally includes the usual provision for accommodating and spinning a sample carrier.

The transmitter coil is fed from a crystal-controlled 60 Mc/s source 22. The field modulation winding is fed from 6 Kc/s oscillator 24, through variable attenuator 26 and amplifier 30. The receiver coil is coupled to an RF amplifier and a first detector of a receiver 32, the output of which is filtered through a 6 Kc/s narrow band filter 34 and is phase detected by 6 Kc/s phase detector 36. A reference signal from oscillator 24 is coupled to the phase detector 36 through a phase selector 38. An output from the phase detector 36 is applied to a recorder 38. The field shift winding 18 is energized by a field shift unit 40 and the field sweep winding 14 by a potentiometer 42, driven by the chart drive of recorder 38.

The units thus far described comprise a basic N.M.R. spectrometer and enable it to operate in a known sideband mode, the oscillator 24 providing field modulation at a first modulation frequency, which interacting with the 60 Mc/s energy by virtue of the nuclear coupling in a measuring sample in probe 20 gives rise to upper and lower sidebands in those regions of the N.M.R. spectrum where nuclear coupling actually takes place and at no other. A first order sideband is used as a measuring sideband and the N.M.R. measuring signal borne upon a 6 Kc/s carrier drives the recorder 38 after phase detection at 36 and consequent extraction of the absorption component. Phase selector unit 36 enables in fact the absorption component to be selected.

The accessory means, which is shown within the dashed rectangle 44, comprises a 5–7 Kc/s oscillator 46, an output of which is coupled to the amplifier 30 through a variable attenuator and phase selector 48. Oscillator 46 provides a second modulation frequency which is selectable over the range of 5 to 7 Kc/s through a frequency selector 50 and is frequency swept in synchronism with the field sweep through the chart recorder driven potentiometer 42 over a range governed by the field sweep range.

The second modulation frequency will give rise to sidebands and again a first order sideband of the same species as the measuring sideband is chosen as a working sideband for either spin-decoupling, in one accessory mode, or field locking in the alternative accessory mode. In either mode of operation, it is desirable to generate a monochromatic line which is maintained stationary at a selectable position on the frequency axis during the time interval when a field sweep is being performed. As the measuring sideband "travels" along the axis and scans the N.M.R. spectrum as the field is swept, the working sideband remains stationary. This is accomplished by sweeping the second modulation frequency, from a convenient initial frequency in the range 5 to 7 Kc/s through frequency selector 50, in a manner for providing that the frequency sweep counteracts the effect of field sweep which would otherwise cause this working sideband to "travel" in the same manner as the measuring sideband.

The energy level required in the working sideband is greater for spin decoupling than for field locking and the variable attenuator 48 provides for the necessary adjustment to be made by the user in changing over from one to the other mode.

Spin decoupling requires the provision of adequate monochromatic energy at a selected position upon the frequency axis. Field locking additionally requires a means for extracting the dispersion component of the signal which is continually generated in the receiver coil as a result of the sustained nuclear coupling provided by a locking sample admixed with the measuring sample in what is known in the art as the single spot mode of field locking. The extraction means is represented in the diagram by 5–7 Kc/s phase detector 52 which receives the locking sample signal upon a 5–7 Kc/s carrier from the receiver 32 and a reference signal from the oscillator 46 and provides a DC output voltage. The DC output voltage is substantially zero when the flux intensity in the working gap is at a desired predetermined required value or the voltage is alternatively of one or other polarity for field excursions in one or other direction. This voltage is amplified by DC amplifier 54 and is coupled to the field correcting coil 16 with a correct polarity for opposing field excursions from the desired predetermined value.

The unit 48 in addition to providing variable attenuation is adapted for providing phase selection which becomes operative when the field locking mode is selected and enables the dispersion component of the locking sample signal to be selected and maximized in the presence of the spurious phase shifts which are generally present in a practical construction.

For a clearer understanding of the basic operation of a system in accordance with our invention we have omitted from the diagram any indication of the switching functions that are performed in changing over from one accessory mode to the other. These functions are immediately apparent to the skilled in the art. It follows from what has been said, for example, that the phase selector of unit 48, the phase detector 52 and the DC amplifier 54 will only be used in the field locking mode.

The system as described herein affords advantages to the user in that the basic spectrometer is not encumbered in cost and complexity with a profusion of components that remain idle most of the time and the accessory means itself makes use of practically the same components for both spin decoupling and field locking. In fact, if spin decoupling is viewed as the principal accessory feature, then the user is given the facility to select field locking as an alternative by the addition of phase detector 52 and amplifier 54.

It is apparent that the system as described herein is distinctly advantageous over systems wherein either spin decoupling or field locking are integrally provided in the basic instrument.

While I have illustrated and described a particular embodiment of my invention, it will be understood that various modifications may be made therein without departing from the spirit of the invention and the scope of the appended claims.

What is claimed is:

1. A nuclear magnetic resonance analysis apparatus having means for establishing a magnetic polarizing field at a sample station, a means for irradiating the sample station at a relatively high frequency to excite gyromagnetic resonance in a sample of matter located in said sample station, a means providing field modulation of said magnetic polarizing field for generating sidebands one of which being a measuring sideband component, a means for sweeping the field and sensing means for indicating gyromagnetic resonance in a sample located at the sample station, and an accessory means for alternatively selectively providing magnetic field intensity stabilization and decoupling of spin resonance, said accessory means including a variable frequency oscillator, a variable attenuator, means connecting the variable frequency oscillator to the means providing field modulation through said variable attenuator, and means for adjusting said attenuator to attenuate the signal from said variable frequency oscillator to one level in order to operate in a spin decoupling mode and to attenuate said signal to a second level to operate in said field stabilization mode.

2. The apparatus of claim 1, wherein said means for sweeping the field is coupled to said variable frequency oscillator for varying the frequency thereof to generate a sideband component having a predetermined fixed frequency during field sweep.

3. The apparatus of claim 2 wherein said field sweep means includes means for synchronously varying said field and altering the frequency of said variable frequency oscillator.

4. The apparatus of claim 3 that further includes a phase detector coupled to said sensing means for detecting deviations in said field when operated in said field stabilization mode.

5. The apparatus of claim 4 wherein said nuclear magnetic resonance apparatus further includes a field correction winding; and said phase detector provides a corrective output signal indicative of the deviation of said field intensity of a desired magnitude, and means coupling said output signal to said field correcting winding.

6. The apparatus of claim 5 wherein said coupling means comprises a DC amplifier.

* * * * *